United States Patent [19] [11] Patent Number: 4,968,564
Tada et al. [45] Date of Patent: * Nov. 6, 1990

[54] MAGNETIC RECORDING MEDIUM

[75] Inventors: Junya Tada, Ichikawa; Tomohisa Watanabe, Sakura; Makoto Akihiro; Kouichi Oka, both of Ichikawa; Takehiko Sato, Musahino, all of Japan

[73] Assignee: Sumitomo Metal Mining Company Limited, Tokyo, Japan

[*] Notice: The portion of the term of this patent subsequent to Sep. 6, 2005 has been disclaimed.

[21] Appl. No.: 253,336

[22] PCT Filed: May 22, 1986

[86] PCT No.: PCT/JP86/00262

§ 371 Date: Feb. 20, 1987

§ 102(e) Date: Feb. 20, 1987

[87] PCT Pub. No.: WO86/07180

PCT Pub. Date: Dec. 4, 1986

Related U.S. Application Data

[63] Continuation of Ser. No. 6,545, Feb. 20, 1987, abandoned.

[30] Foreign Application Priority Data

May 27, 1985 [JP] Japan ............................. 60-114477
Jun. 14, 1985 [JP] Japan ............................. 60-129335
Jun. 19, 1985 [JP] Japan ............................. 60-133314
Jun. 24, 1985 [JP] Japan ............................. 60-137477
Jun. 26, 1985 [JP] Japan ............................. 60-140004
Dec. 13, 1985 [JP] Japan ............................. 60-280490

[51] Int. Cl.$^5$ ............................................. G11B 23/00
[52] U.S. Cl. .................................... 428/433; 427/129; 427/132; 428/457; 428/611; 428/694; 428/702; 428/900
[58] Field of Search ............... 428/694, 702, 900, 457, 428/611, 433; 427/35, 50, 129, 132; 204/192.2

[56] References Cited

U.S. PATENT DOCUMENTS 4,323,629 4/1982 Kunieda et al. ...................... 428/457
4,511,635 4/1985 Nagao et al. ......................... 428/900
4,592,948 6/1986 Kohomoto et al. ................. 428/216
4,661,418 4/1987 Yanai et al. .......................... 428/610
4,769,282 9/1988 Tada et al. ........................... 428/457

FOREIGN PATENT DOCUMENTS 198615   5/1981 Japan .
 16512   1/1983 Japan .
113340   7/1983 Japan .
189349  11/1983 Japan .
204146  11/1983 Japan .

Primary Examiner—Paul J. Thibodeau
Attorney, Agent, or Firm—Watson, Cole, Grindle and Watson

[57] ABSTRACT

A magnetic recording medium comprising a non-magnetizable substrate and a magnetic layer formed on the substrate, in which the magnetic layer comprises not more than 13% by weight of one or more of rare earth elements of Y, La, Ce, Pr, Nd, Sm, Gd, Tb or Dy, 3-13% by weight of oxygen, balance of Co and inevitable impurities. The magnetic layer may contain less than 22% by weight of Ni. The magnetic recording medium has a favorable corrosion resistance and excellent magnetic properties.

10 Claims, 12 Drawing Sheets

MAGNETIC RECORDING MEDIUM

This application is a continuation of application Ser. No. 006,545, filed Feb. 20, 1987, now abandoned.

TECHNICAL FIELD

This invention concerns a magnetic recording medium and, particularly, a Co-Ni series magnetic recording film which includes specific rare earth elements that improve its magnetic properties and its corrosion resistance.

THE PRIOR

Magnetic recording media which comprise a nonmagnetic substrate having a coating thereon of a kneaded mixture of a magnetic powder, such as of $\gamma$-$Fe_2O_3$ or Fe and a synthetic resin binder are known. Also known are thin metal film-type magnetic recording media which comprise a substrate having a thin metal magnetic film thereon. Such thin metal film-type magnetic recording media are capable of high density recording. Methods of forming the thin metal magnetic film on the substrate include (a) a chemical plating method, this being a wet process, and (b) a sputtering method, an ion plating method or a vacuum evaporation method, this being a dry processes.

It has generally been considered that a dry process (b) can provide a favorable magnetic recording medium as compared with the wet process (a) in view of the primary treatment applied to the substrate and the homogeneity of the magnetic layer in the longitudinal direction and the lateral direction.

However, the thin metal film type magnetic recording medium formed by the dry process has a much lower thermodynamic stability and more pores as compared with oxide magnetic powder, and it tends to be readily corroded in air, thus causing a reduction in its performance.

Many attempts have been made to improve the corrosion resistance without reducing the magnetic properties of the magnetic recording medium. For example, it has been disclosed in Japanese Patent Laid Open No. Sho 56-15014, No. Sho 57-196507 and No. Sho 58-134414 to improve the corrosion resistance of a magnetic recording medium by either adding metals, supplying a gas mixture of ozone and oxygen to the magnetic layer portion, or quantitatively setting the number of oxygen atoms.

However, only a slight improvement in the corrosion resistance is achieved by any of the foregoing treatments, and the saturation magnetization or the residual magnetization is decreased depending on the treatment, resulting in the reduction in the reproduced signal level of the magnetic recording medium.

The object of this invention is to overcome the foregoing drawbacks in the conventional magnetic recording media and to provide those with improved magnetic properties and corrosion resistance by adding specific rare earth elements to the magnetic recording medium of Co-Ni series of metal film type.

SUMMARY OF THE INVENTION

In this invention, a magnetic layer comprising Ni, rare earth element R, oxygen, Co and other inevitable impurities is formed on a non-magnetic substrate, the rare earth element R consisting of one or more of Y, La, Ce, Pr, Nd, Sm, Gd, Tb and Dy, in which the composition of the magnetic layer comprises, on the weight basis, 0–22% Ni, not more than 13% rare earth element R, 3–13% oxygen, the balance of Co and inevitable impurities.

This invention will further be explained below, starting with an explanation of why the composition of the magnetic layer formed on the non-magnetic substrate is limited as noted above.

Ni basically has a tendency of reducing the residual magnetization of the magnetic recording medium and has an effect of improving the corrosion resistance of the magnetic layer of metal mainly composed of Co. If it is contained in excess of 22% by weight, the residual magnetization of the magnetic layer is remarkably reduced, thus lowering the reproduced signal level.

The rare earth element R consisting one or more of Y, La, Ce, Pr, Nd, Sm, Gd, Td, and Dy is added in order to improve the magnetic properties and the corrosion resistance of the Co-Ni series metal magnetic layer. If it is added in excess of 13% by weight, the coercive force and the saturation magnetization are decreased and the corrosion resistance as well.

For obtaining the magnetic layer of the above-mentioned composition, one of B, C, Al, Si, Sn, S, Cu, Zn, Fe, Ti, Cr, Zr may be contained inevitably in purifying starting material or alloying. However, if these inevitable impurities are contained by more than 1% by weight, the magnetic properties are reduced.

Oxygen is contained in the magnetic recording medium to improve the coercive force of the magnetic recording medium by partially chemically reacting with the metal to form a metal oxide membrane and causing the other portion to be adsorbed in the magnetic layer of the magnetic recording medium. If it is less than 3% by weight, no effect is recognized, the coercive force of the magnetic recording medium is not improved and the corrosion resisrance is reduced. On the other hand, if it is contained in excess of 13% by weight, a significant effect of oxidization appears and the ratio of metal oxide is increased, thereby failing to obtain sufficient corrosion resistance and the saturation magnetization Ms is reduced.

The magnetic layer of the composition according to this invention as described above is desirably about from 0.1 $\mu$m to 1.0 $\mu$m in thickness. If it is less than 0.1 $\mu$m, no sufficient reproduced signal level is obtained, whereas if the thickness exceeds 1.0 $\mu$m, the flexibility of the film is decreased and it is difficult to increase the recording density.

As the non-magnetic substrate on which such a magnetic layer is formed, plastic films having appropriate flexibility and stretch resistance and heat resistance upon vapor deposition may be used, for example, films made of polyester, acetate, polycarbonate and polyimide with a thickness of 5–25 $\mu$m, as well as a glass substrate and a metal substrate such as of Al as a disclike substrate.

The method of preparing a magnetic recoding medium according to this invention will now be discussed. Since it is required that the magnetic layer to be formed has a high coercive force and a high saturation magnetic flux density due to the requirement for high density recording, it is desirable to employ a dry process, such as sputtering, ion plating or vacuum evaporation.

In the dry process, it is possible to improve the coercive force by entering the composite atoms obliquely to the substrate, thereby forming a thin metal film. When the composite atoms are entered obliquely to the substrate, an acicular structure of thin metal film grows with the orientation direction of crystals being oblique to the substrate. In such a state, the magnetacrystalline anisotropy and the shape magnetic anisotropy of the crystals cause the magnetic anisotropic properties and the coercive force of the magnetic recording medium to be improved by the increase in the magnetic anisotropy. Further, the dry process is excellent in terms of the reproducibility of the magnetic properties of the magnetic layer and the manufacturing also has advantage that a uniform layer in the longitudinal direction and the lateral direction can be achieved.

It is desirable to apply a primary treatment such as corona discharging treatment or primer treatment to the non-magnetizable substrate in order to improve the adhesiveness with the magnetic layer.

Explanation will be made specifically to the magnetic recording medium according to this invention referring to examples thereof in conjunction with the drawings and in accordance with the production method.

DETAILED DESCRIPTION

Figure 1:
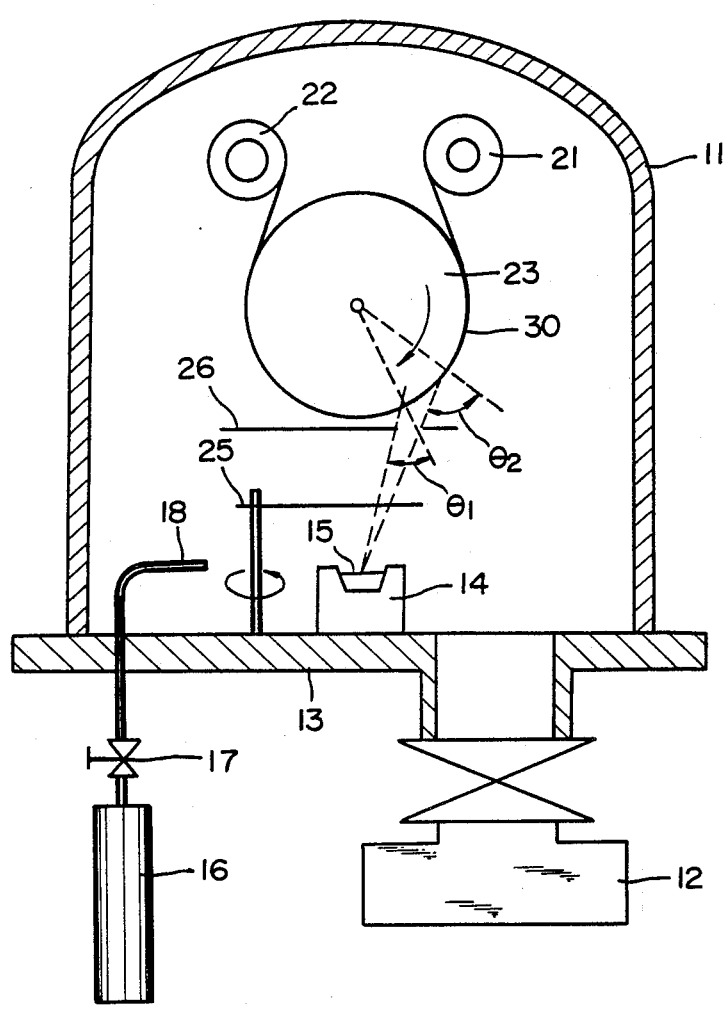
FIG. 1 is a cross sectional view of a device for manufacturing a magnetic recording media according to this invention.

FIG. 1 shows the cross sectional structure of an embodiment of a manufacturing device for the magnetic recording medium according to this invention, in which vacuum evaporation chamber 11 substantially of a bell-like shape is used. The vacuum evaporation chamber 11 is connected with vacuum pump 12 and adapted such that the inside of the vacuum evaporation chamber 11 can be set to a predetermined vacuum degree by driving the vacuum pump 12.

Electron beam gun 14 is disposed on the bottom plate 13 of the vacuum evaporation chamber 11, and ferromagnetic metal 15 is disposed within the electron beam gun 14. The ferromagnetic metal 15 is mainly composed of Co, Ni and, further, one or more of rare earth element R from Y, La, Ce, Pr, Nd, Sm, Gd, Tb and Dy and the composition is set so as to provide a predetermined composition of the film.

While on the other hand, introduction pipe 18 is led out from oxygen cylinder 16 by way of variable leak valve 17 and the end of the introduction pipe 18 is inserted through the bottom 13 to the inside of the vacuum evaporation chamber 11. Unwinder 21 and winder 22 are rotatably disposed in the vacuum evaporation chamber 11 and can 23 is rotatably disposed between the unwinder 21 and the winder 22.

Shutter 25 is disposed between the electron beam gun 14 and the can 23. The shutter 25 is rotatable and opened only upon film forming. The maximum incident angle $\theta_2$ and the minimum incident angle $\theta_1$ of the evaporated matters to the substrate can be adjusted by shutter member 26.

Non-magnetic substrate 30 is wound around the unwinder 21, the end of the non-magnetic substrate 30 is let out and taken-up by way of the can 23 around the winder 22. A polyester film of 12 $\mu$m thickness was used as the non-magnetic substrate 30.

The unwinder 21 and the winder 22 are driven and the non-magnetic substrate 30 is sent in contact with the circumferential surface of the can 23 at a speed, for example, of 15 m/min. The vacuum pump 12 is driven to evacuate the inside of the vacuum evaporation chamber 11 to less than $5 \times 10^{-6}$ torr thereby evaporating the ferromagnetic metal 15 in the electron beam gun 14 at a predetermined speed. At the same time, ON-OFF cock 17 is opened to release oxygen gas from the introduction pipe 18 to the inside of the vacuum evaporation chamber 11. The supply of the oxygen gas to the inside of the vacuum evaporation chamber 11 is also set such that a predetermined oxygen composition in the film is obtained.

By opening of the shutter 25, in the ferromagnetic metal 15 released from the electron beam gun 14, only the portion entering obliquely within a predetermined range of angle relative to the non-magnetic substrate 30 passes through the shutter member 26 and reaches the non-magnetic substrate 30.

That is, among the ferromagnetic metal 15 released from the electron beam gun 14, only the portion within the range of angle from the minimum angle $\theta_1$ to the maximum angle $\theta_2$ as shown in FIG. 1 relative to the normal line to the plate surface of the non-magnetic substrate 30 passes through the shutter 25 and enters obliquely to the non-magnetic substrate 30. In this way, a magnetic layer of 0.2 $\mu$m thickness was formed.

The thus obtained magnetic recording media were cut and served for the analysis of the composition and the evaluation for the magnetic properties and the corrosion resistance respectively.

For the composition analysis, EPMA analysis and chemical analysis were used in combination, and the magnetic properties were measured by a vibrating sample magneto meter. Then, the evaluation of the corrosion resistance was conducted by maintaining the magnetic recording medium to be measured in an atmosphere prepared by a thermostable and humidity stable tank (temperature 50° C., humidity 90 %) over a predetermined of corrosion time T, then taking out the medium from the temperature stable and humidity stable tank, irradiating laser beam to the magnetic recording medium, measuring the amount of light permeating through the magnetic recording medium and determining the transmittance thereof.

Figure 2:
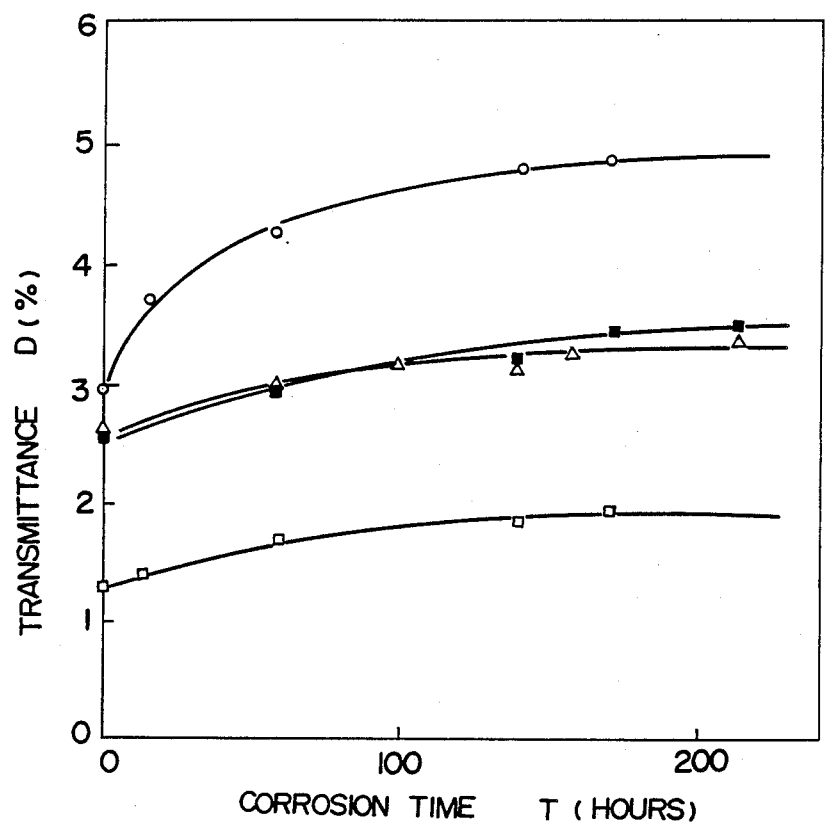
FIG. 2 is a view showing the corrosion resistance of magnetic recording mediums in the example of this invention and conventional example, FIGS. 3(a) and (b) are views showing the relationship between the content Rc of rare earth element and the coercive force Hc in the magnetic recording media of various compositions.

The results thus obtained are shown in FIG. 2 and FIG. 3 and Table 1 (transmittance after 100 hours of corrosion time).

B, C, Al, Si, Sn, S, Cu, Zn, Fe, Ti, Cr, and Zr were analyzed as inevitable impurity elements other than Ni, R, and oxygen in the medium and the total amount therefor was less than 1 wt %.

TABLE 1

| Sample No. | Medium composition (wt %) Co | Ni | R | | O | Magnetic property Ms (Gauss) | Hc (Oe) | Transmittance (%) | |
|---|---|---|---|---|---|---|---|---|---|
| 1 | Balance | 2.8 | Y | 12.0 | 6.2 | 810 | 780 | 2.5 | * |
| 2 | " | 14.0 | Y | 0.4 | 10.8 | 790 | 750 | 2.0 | |
| 3 | " | 18.0 | La | 2.5 | 4.4 | 700 | 750 | 2.5 | |
| 4 | " | 3.7 | Ce | 12.2 | 5.9 | 850 | 760 | 3.5 | |
| 5 | " | 12.2 | Pr | 1.8 | 8.3 | 815 | 800 | 0.5 | |
| 6 | " | 2.4 | " | 12.0 | 6.6 | 1030 | 810 | 3.5 | |
| 7 | " | 14.0 | " | 4.4 | 3.6 | 920 | 760 | 3.5 | |
| 8 | " | 19.1 | " | 5.2 | 3.2 | 860 | 825 | 3.0 | |
| 9 | " | 20.2 | " | 2.2 | 4.5 | 735 | 775 | 3.0 | |
| 10 | " | 19.5 | " | 0.5 | 8.3 | 810 | 790 | 0.5 | |
| 11 | " | 12.1 | " | 0.8 | 8.4 | 800 | 810 | 0.5 | |
| 12 | " | 2.5 | Nd | 12.2 | 6.5 | 980 | 745 | 3.5 | |
| 13 | " | 19.7 | " | 2.4 | 4.5 | 750 | 710 | 3.0 | |
| 14 | " | 14.0 | " | 4.4 | 3.6 | 920 | 700 | 3.0 | |
| 15 | " | 14.6 | " | 2.8 | 10.1 | 765 | 820 | 2.0 | |
| 16 | " | 14.5 | " | 1.4 | 9.2 | 815 | 800 | 1.5 | |
| 17 | " | 12.8 | Sm | 6.0 | 10.5 | 760 | 930 | 2.5 | |
| 18 | " | 2.5 | " | 9.6 | 6.5 | 970 | 800 | 3.5 | |
| 19 | " | 13.5 | " | 4.5 | 3.6 | 910 | 760 | 3.0 | |
| 20 | " | 19.0 | " | 5.1 | 3.2 | 850 | 820 | 3.0 | |
| 21 | " | 19.6 | " | 2.5 | 4.5 | 735 | 764 | 3.0 | |
| 22 | " | 14.4 | " | 0.7 | 8.2 | 820 | 760 | 1.5 | |
| 23 | " | 3.8 | Gd | 3.5 | 11.3 | 800 | 850 | 2.5 | |
| 24 | " | 14.2 | " | 4.4 | 3.7 | 900 | 780 | 3.5 | |
| 25 | " | 12.8 | " | 5.8 | 10.3 | 740 | 880 | 2.5 | |
| 26 | " | 3.6 | " | 9.5 | 6.5 | 980 | 800 | 3.5 | |
| 27 | " | 19.0 | " | 5.2 | 3.3 | 825 | 830 | 3.0 | |
| 28 | " | 18.8 | " | 2.4 | 4.6 | 800 | 750 | 3.0 | |
| 29 | " | 19.3 | " | 0.3 | 8.5 | 750 | 730 | 2.0 | |
| 30 | " | 14.5 | Tb | 6.3 | 11.7 | 740 | 960 | 2.5 | |
| 31 | " | 3.9 | " | 9.2 | 6.5 | 935 | 800 | 3.5 | |
| 32 | " | 14.0 | " | 4.5 | 3.6 | 890 | 810 | 3.0 | |
| 33 | " | 18.4 | " | 5.4 | 3.5 | 805 | 850 | 3.5 | |
| 34 | " | 18.8 | " | 2.4 | 4.5 | 770 | 790 | 3.5 | |
| 35 | " | 14.7 | " | 1.2 | 8.0 | 800 | 860 | 1.0 | |
| 36 | " | 12.8 | Dy | 6.1 | 11.5 | 720 | 880 | 2.5 | |
| 37 | " | 4.0 | " | 8.8 | 6.5 | 920 | 780 | 3.5 | |
| 38 | " | 14.5 | " | 4.6 | 3.7 | 875 | 800 | 3.0 | |
| 39 | " | 18.3 | " | 5.4 | 3.6 | 795 | 820 | 3.0 | |
| 40 | " | 18.4 | " | 2.3 | 4.1 | 740 | 750 | 3.5 | |
| 41 | " | 14.7 | " | 0.6 | 8.3 | 810 | 800 | 1.0 | |
| 42 | " | 7.6 | Y<br>Pr | 0.5<br>0.3 | 11.6 | 790 | 830 | 2.5 | |
| 43 | " | 13.1 | Y<br>Gd | 5.2<br>5.4 | 9.5 | 830 | 1010 | 3.5 | |
| 44 | " | 4.5 | Y<br>Ce | 6.4<br>3.1 | 6.0 | 870 | 850 | 3.0 | |
| 45 | " | — | Y<br>La | 3.2<br>2.1 | 5.2 | 1005 | 815 | 3.5 | |
| 46 | " | 18.1 | La<br>Ce | 0.9<br>2.0 | 4.5 | 760 | 700 | 3.5 | |
| 47 | " | 10.5 | Pr<br>Sm | 1.7<br>1.2 | 10.4 | 800 | 930 | 2.0 | |
| 48 | " | 2.8 | Pr<br>Nd | 6.5<br>5.9 | 5.9 | 950 | 790 | 3.0 | |
| 49 | " | 2.8 | Pr<br>Gd | 10.5<br>1.3 | 6.4 | 1005 | 820 | 3.5 | |
| 50 | " | 12.0 | Nd<br>Dy | 0.5<br>0.2 | 10.6 | 800 | 790 | 2.5 | |
| 51 | " | 17.9 | Nd<br>Tb | 1.2<br>1.6 | 4.6 | 760 | 710 | 3.0 | |
| 52 | " | 17.9 | Nd<br>Tb | 1.2<br>1.6 | 8.5 | 760 | 790 | 2.0 | |
| 53 | " | — | Sm<br>La | 0.3<br>0.2 | 9.5 | 830 | 1010 | 3.5 | |
| 54 | " | 18.1 | Sm<br>Dy | 1.4<br>1.0 | 4.5 | 700 | 805 | 3.0 | |
| 55 | " | 4.5 | Gd<br>Dy | 6.1<br>3.3 | 6.1 | 880 | 840 | 3.0 | |
| 56 | " | 2.3 | — | — | 9.5 | 710 | 980 | 4.5 | ** |
| 57 | " | 20.7 | — | — | 6.3 | 960 | 650 | 5.0 | |
| 58 | " | 19.0 | Y | 4.9 | 2.0 | 910 | 350 | 6.0 | *** |
| 59 | " | 11.5 | La | 2.4 | 14.4 | 260 | 710 | 7.0 | |
| 60 | " | 11.1 | Pr | 2.5 | 13.9 | 420 | 1210 | 3.5 | |
| 61 | " | 18.8 | " | 15.1 | 6.5 | 770 | 250 | 6.5 | |
| 62 | " | 15.7 | " | 3.8 | 2.0 | 980 | 270 | 6.0 | |
| 63 | " | 11.4 | Nd | 2.5 | 13.8 | 380 | 1110 | 4.5 | |
| 64 | " | 17.3 | " | 15.2 | 6.5 | 700 | 360 | 5.5 | |
| 65 | " | 16.2 | " | 4.0 | 2.1 | 890 | 225 | 6.0 | |

TABLE 1-continued

| Sample No. | Medium composition (wt %) | | | | Magnetic property | | Transmittance (%) | |
|---|---|---|---|---|---|---|---|---|
| | Co | Ni | R | | O | Ms (Gauss) | Hc (Oe) | |
| 66 | " | 11.3 | Sm | 1.7 | 13.8 | 710 | 320 | 4.0 | |
| 67 | " | 18.7 | " | 14.0 | 6.6 | 420 | 300 | 6.5 | |
| 68 | " | 15.7 | " | 3.4 | 2.4 | 960 | 250 | 6.0 | |
| 69 | " | 15.1 | " | 15.2 | 9.1 | 650 | 680 | 6.5 | |
| 70 | " | 11.0 | Gc | 2.6 | 14.1 | 380 | 860 | 3.0 | |
| 71 | " | 5.5 | " | 14.2 | 6.2 | 700 | 240 | 6.0 | |
| 72 | " | 15.7 | " | 3.8 | 2.1 | 980 | 300 | 6.5 | |
| 73 | " | 11.2 | Tb | 2.6 | 13.9 | 260 | 760 | 3.5 | |
| 74 | " | 6.1 | " | 13.1 | 6.2 | 690 | 255 | 6.5 | |
| 75 | " | 14.5 | " | 3.6 | 2.1 | 950 | 450 | 6.0 | |
| 76 | " | 11.4 | Dy | 2.7 | 13.8 | 250 | 700 | 3.5 | |
| 77 | " | 8.2 | " | 13.5 | 6.4 | 660 | 270 | 6.5 | |
| 78 | " | 14.8 | " | 3.6 | 2.1 | 930 | 440 | 6.5 | ✷·✷·✷ |
| 79 | " | 25.6 | Y | 0.2 | 9.7 | 700 | 550 | 6.5 | |
| | | | Dy | 0.5 | | | | | |
| 80 | " | 16.9 | Sm | 0.1 | 2.1 | 960 | 350 | 6.0 | |
| | | | La | 0.1 | | | | | |
| 81 | " | 8.9 | Ce | 0.7 | 17.9 | 425 | 950 | 6.0 | |
| | | | Tb | 0.1 | | | | | |
| 82 | " | 17.4 | Pr | 13.1 | 6.4 | 770 | 270 | 6.5 | |
| | | | Sm | 2.2 | | | | | |
| 83 | " | 18.7 | Sm | 3.8 | 2.1 | 960 | 230 | 6.0 | |
| | | | Gd | 1.3 | | | | | |
| 84 | " | 11.8 | Tb | 1.3 | 14.1 | 260 | 710 | 6.5 | |
| | | | Dy | 1.1 | | | | | |
| 85 | " | 17.0 | La | 4.6 | 6.4 | 770 | 300 | 7.0 | |
| | | | Ce | 10.7 | | - | | | |

✷ . . . This invention
✷·✷ . . . Conventional example
·✷·✷·✷· . . . Comparative example FIG. 2 shows the relationship between the corrosion time T (hour) and the transmittance D (%) of the magnetic recording media each of an identical film thickness having 5 types of compositions, in which the magnetic layer shown by the symbol ○ has a composition of 21.3 wt. % Ni, 9.5 wt % O and the balance of Co, the magnetic layer shown by the symbol △ has a composition of 14.2 wt % Ni, 4.4 wt % Gd as the rare earth element R, 3.7 wt % O and the balance of Co, the magnetic layer shown by the symbol ■ has a composition comprising 18.4 wt % Ni, 5.4 wt % Tb, 3.5 wt % O and the balance of Co and, further, the magnetic layer shown by the symbol □ has a composition comprising 10.5 wt % Ni, 1.7 wt % Pr as the rare earth element, 1.2 wt % Sm, 10.4 wt % O and the balance of Co.

In the magnetic recording medium not containing the rare earth element R (shown by ○ for the measuring points) the transmittance D is increased along with an increase in the corrosion time T and the transmittance D is increased to about 5% if the corrosion time exceeds 100 hours.

In the magnetic recording medium shown by △, □, ■ for the measuring points in FIG. 2, the transmittance D does not increase to more than about 3.5% even if the corrosion time T increases by more than about 100 hours, showing that the corrosion resistance is excellent. These magnetic recording media correspond to the examples shown by specimen numbers 47, 24 and 33, respectively, in Table 1.

It is considered that the corrosion resistance of the magnetic recording medium is increased under with the presence of the rare earth element R, due to the gettering effect in which the rare earth element R combines with the oxygen introduced in the vacuum evaporation chamber 11 to form an oxide of the rare earth element R and thus the oxide film covers the magnetic layer to protect the magnetic layer.

Figure 3A:
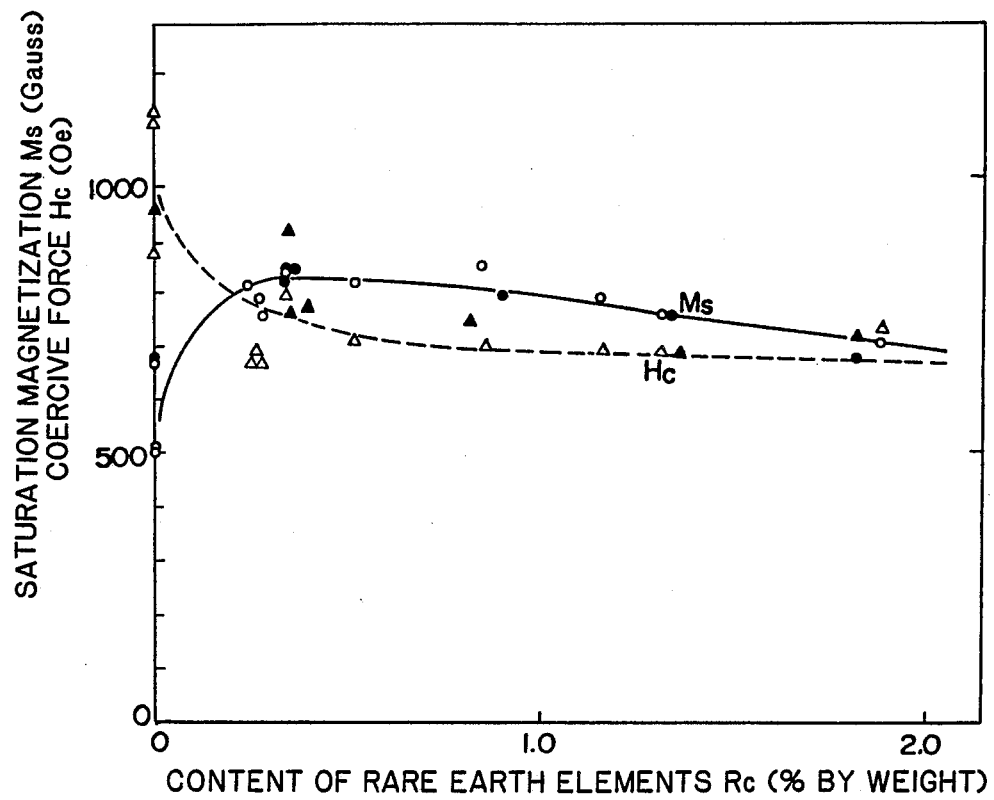

FIG. 3(a) shows the relationship between the content Rc of the rare earth element R, the coercive force Hc of the magnetic recording medium and the saturation magnetization Ms of magnetic recording media having two types of compositions, the magnetic layer represented by the symbols ○ (Ms) and △ (Hc) having a composition comprising 12.0 wt % Ni, 10.6 wt % O and the balance of Co+Nd+Dy (Nd and Dy weight ratio is 5:2), and the magnetic layer represented by the symbols ■ (Ms) and ▲ (Hc) having a composition comprising 7.6 wt % Ni, 11.6 wt % O and the balance of Co+Y+Pr (Y and Pr weight ratio is 5:3).

Figure 3B:
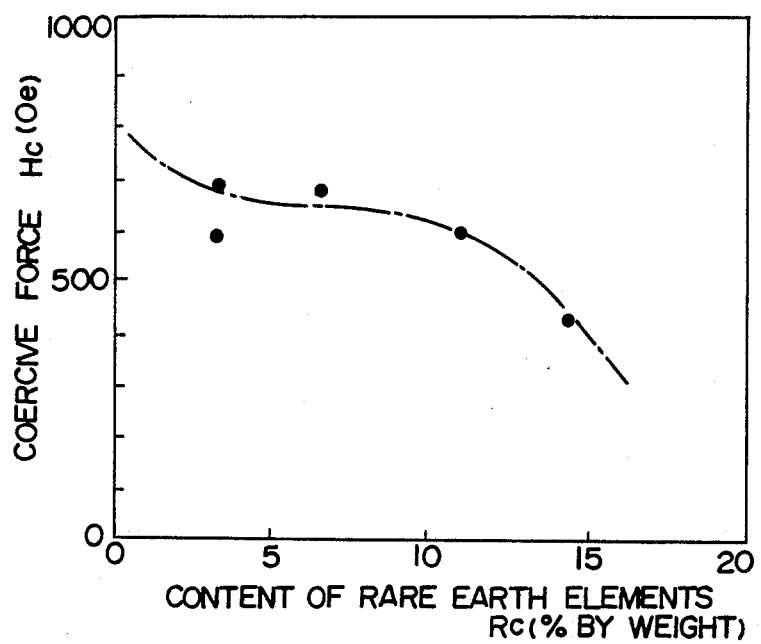

FIG. 3(b) shows the coercive force Hc of the magnetic recording medium in the case where the content Rc of the rare earth element R is increased as compared with that in FIG. 3(a). The magnetic layer represented by the symbol has a composition comprising 15 wt % Ni, 5 wt % O and the balance of Co+Sm+Tb (Sm and Tb weight ratio is 3:2).

As is apparent from the result of the measurement in FIGS. 3(a)(b), although the magnetic properties are excellent a content of the rare earth element R being not more than 13 wt %, the coercive force Hc of the magnetic recording medium is remarkably reduced if it exceeds 13 wt %.

Then, the relationships between the corrosion time T and the transmittance D measured for the magnetic recording media having the compositions as shown in Table 2 described below are shown in FIGS. 4 through 11 in the same manner as above.

It can be seen that in all of the Figures that the magnetic recording media according to this invention containing specific amounts of rare earth elements R show extremely small increases in the transmittance D even after the elapse of 200 hours of corrosion time T, thus showing excellent corrosion resistance as compared with the magnetic recording medium not containing the rare earth element R.

Further, the result obtained by varying the content Rc of the rare earth element R and examining the effect on the coercive force Hc for the magnetic recording media in Table 3 described below are shown in FIGS. 12 through 19.

As apparent from FIGS. 12-19, although excellent coercive force Hc is provided if the rare earth element R is added by not more than 13 wt %, the coercive force is remarkably reduced if it exceeds 13 wt %.

TABLE 2

Figure 4:
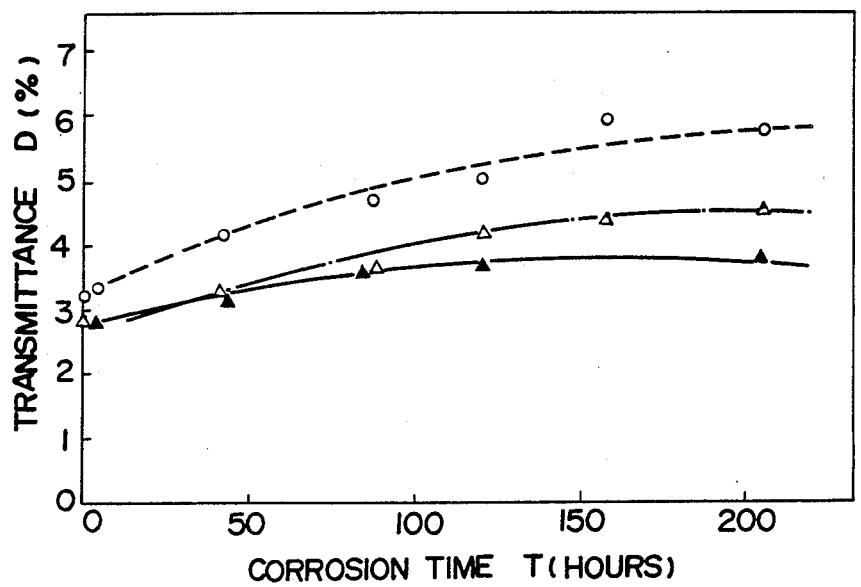
FIGS. 4 through 11 are views showing the effects of each of the rare earth elements on the corrosion resistance of the magnetic recording media.
Figure 5:
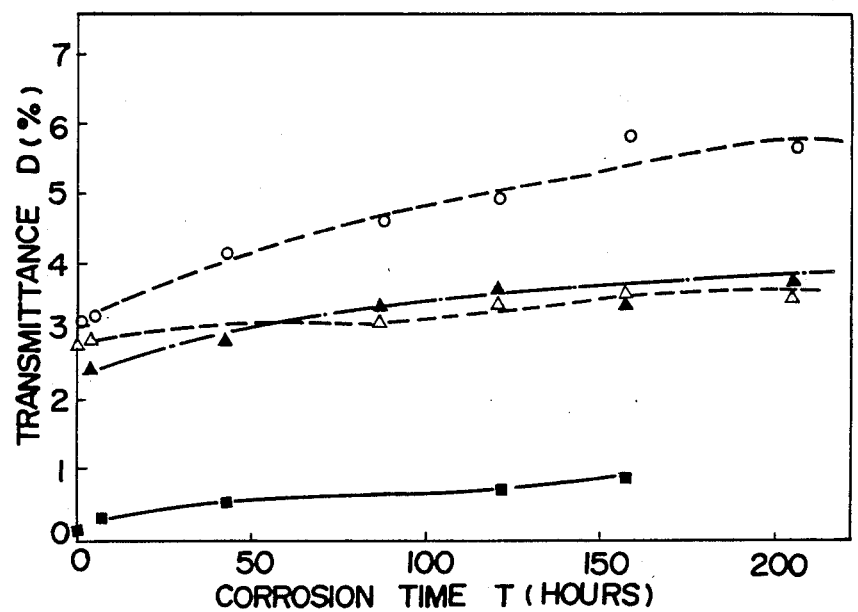
Figure 6:
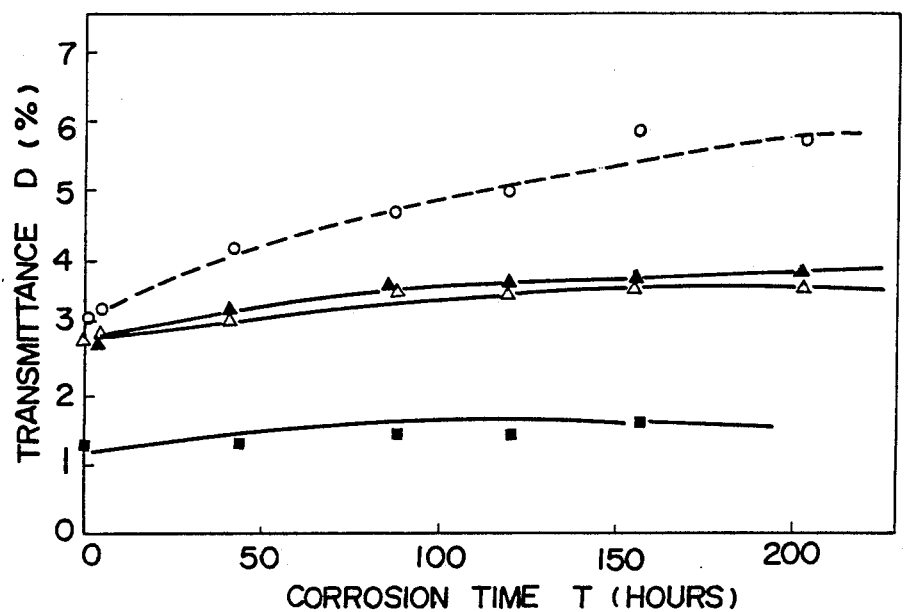
Figure 7:
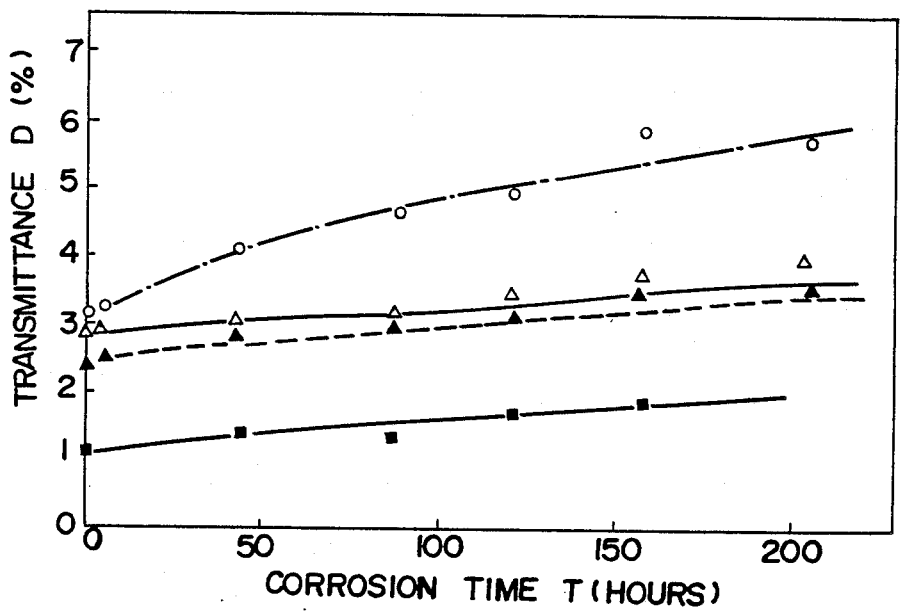
Figure 8:
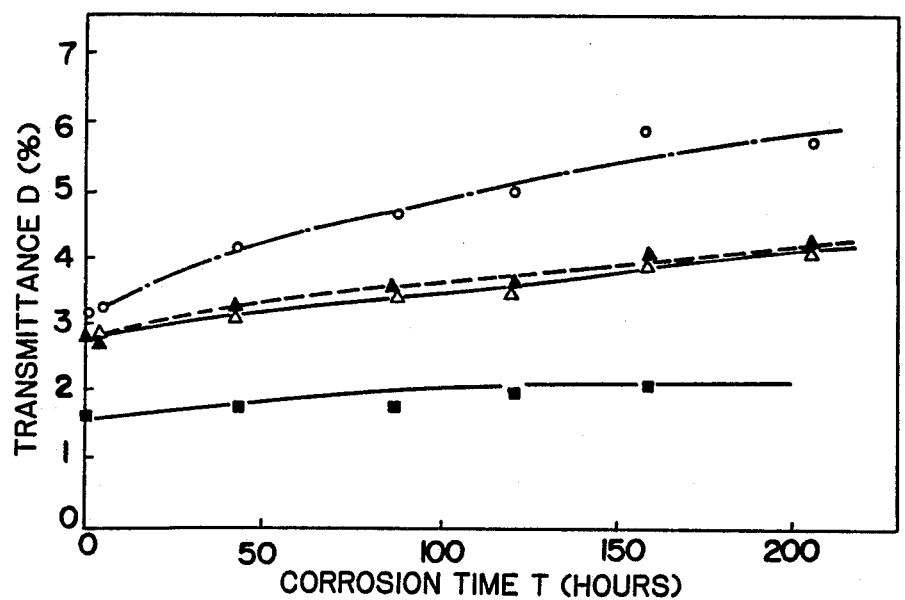
Figure 9:
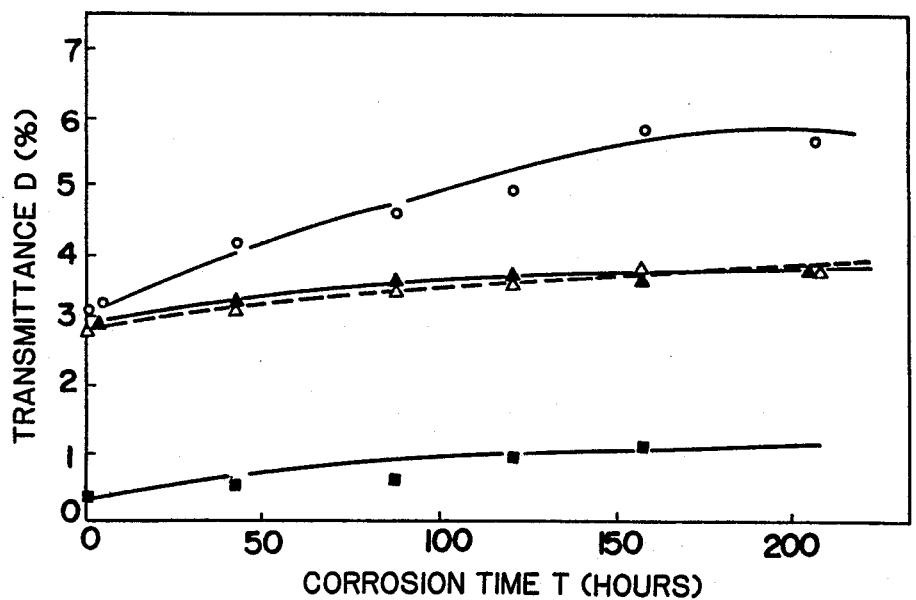
Figure 10:
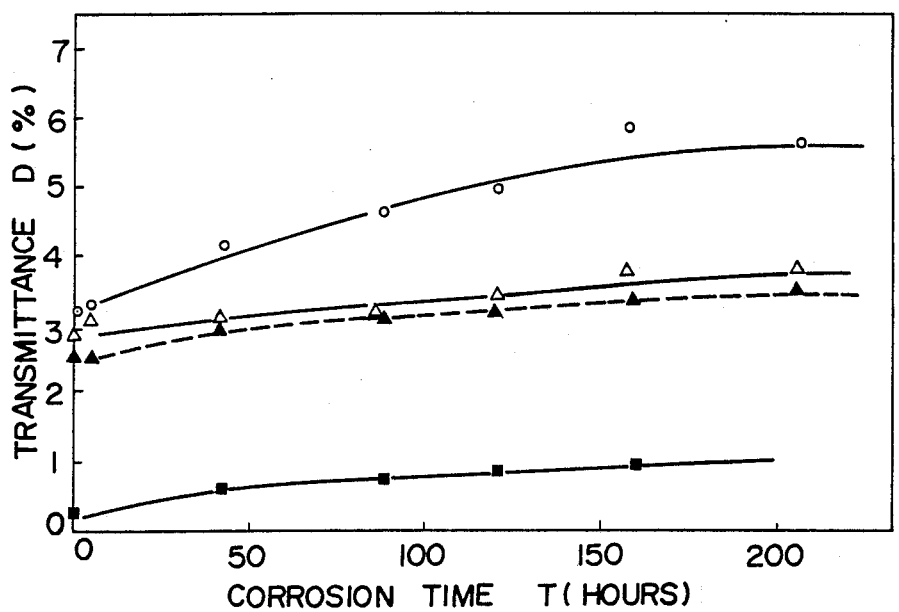
Figure 11:
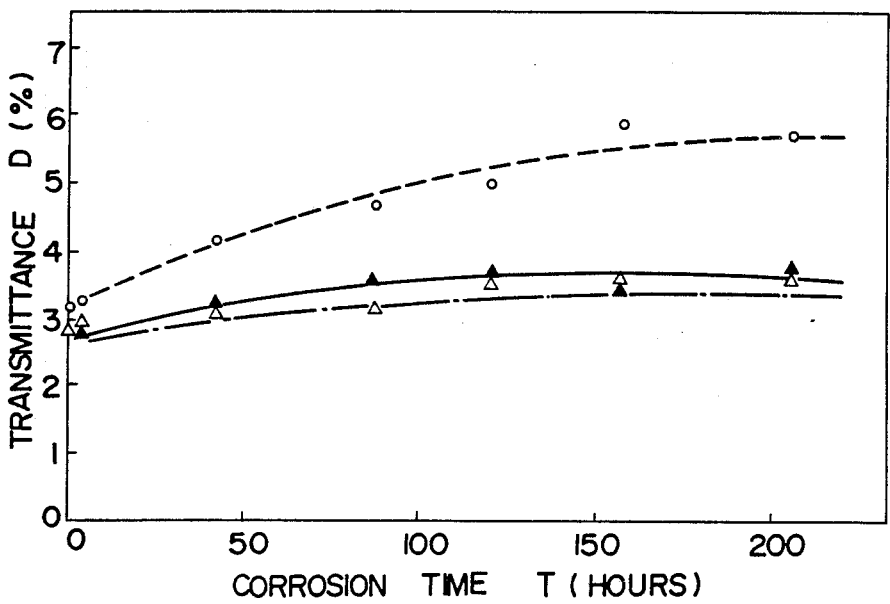

| | Symbol | Co (wt %) | Ni (wt %) | R (wt %) | | O (wt %) |
|---|---|---|---|---|---|---|
| FIG. 4 | ○ | Balance | 16.0 | — | — | 5 |
| " | " | " | 2.8 | Y | 12 | 6.2 |
| " | △ | " | 18.1 | La | 2.5 | 4.4 |
| FIG. 5 | ○ | " | 16.0 | — | — | 5 |
| " | ▲ | " | 16.0 | Pr | 2 | 5 |
| " | △ | " | 16.0 | Pr | 5 | 5 |
| " | ■ | " | 14.5 | Pr | 1.5 | 9.0 |
| FIG. 6 | ○ | " | 16 | — | — | 5 |
| " | ▲ | " | 16 | Nd | 2 | 5 |
| " | △ | " | 16 | Nd | 5 | 5 |
| " | ■ | " | 14.5 | Nd | 1.4 | 9.2 |
| FIG. 7 | ○ | " | 16 | — | — | 5 |
| " | ▲ | " | 16 | Sm | 2 | 5 |
| " | △ | " | 16 | Sm | 5 | 5 |
| " | ■ | " | 14.4 | Sm | 0.7 | 8.2 |
| FIG. 8 | ○ | " | 16 | — | — | 5 |
| " | ▲ | " | 16 | Gd | 2 | 5 |
| " | △ | " | 16 | Gd | 5 | 5 |
| " | ■ | " | 19.3 | Gd | 0.3 | 8.5 |
| FIG. 9 | ○ | " | 16 | — | — | 5 |
| " | ▲ | " | 16 | Tb | 2 | 5 |
| " | △ | " | 16 | Tb | 5 | 5 |
| " | ■ | " | 14.7 | Tb | 1.2 | 8 |
| FIG. 10 | ○ | " | 16 | — | — | 5 |
| FIG. 10 | ▲ | " | 16 | Dy | 2 | 5 |
| FIG. 10 | △ | " | 16 | Dy | 5 | 5 |
| FIG. 10 | ■ | " | 14.7 | Dy | 0.6 | 8.3 |
| FIG. 11 | ○ | " | 16 | — | — | 5 |
| FIG. 11 | ▲ | " | 2.8 | Gd Pr | 1.3 10.5 | 6.4 |
| FIG. 11 | △ | " | 18.1 | Sm Dy | 1.4 1.0 | 4.5 |

TABLE 3

Figure 12:
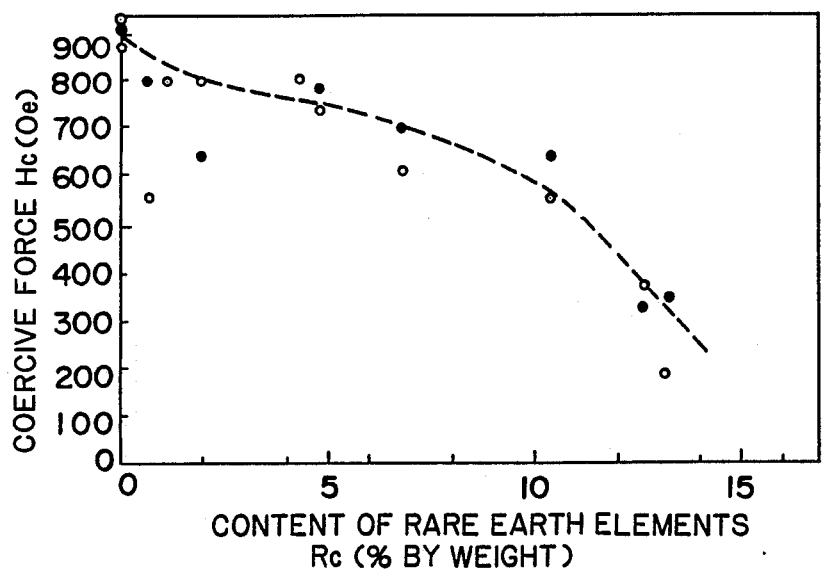
FIGS. 12 through 19 are views similar to FIG. 3(b) showing the relationship between the content of the rare earth element and the coercive force.
Figure 13:
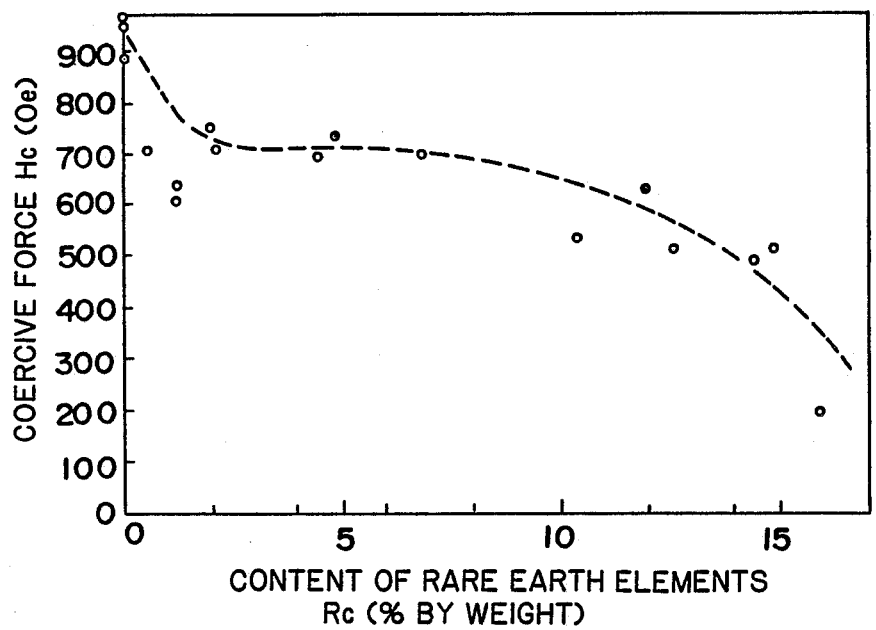
Figure 14:
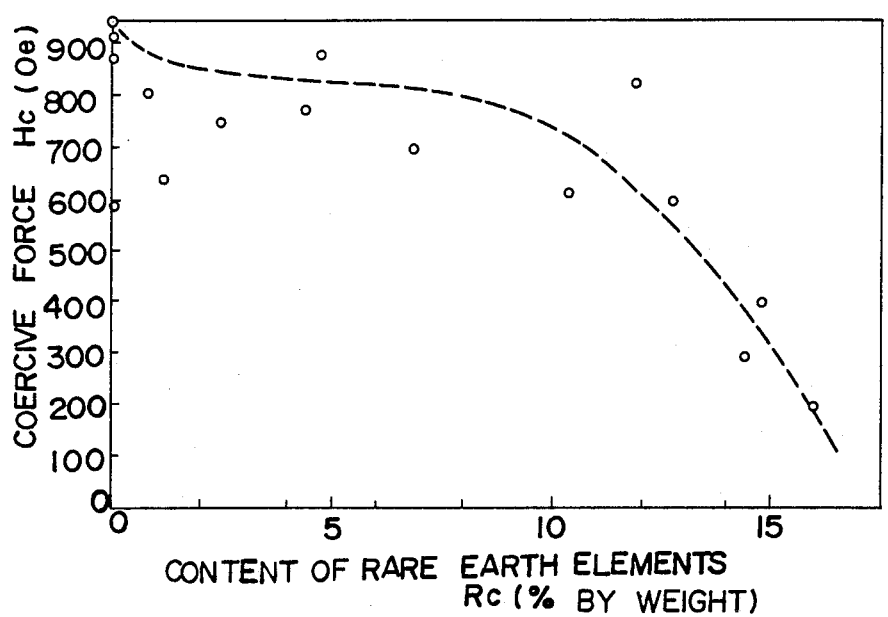
Figure 15:
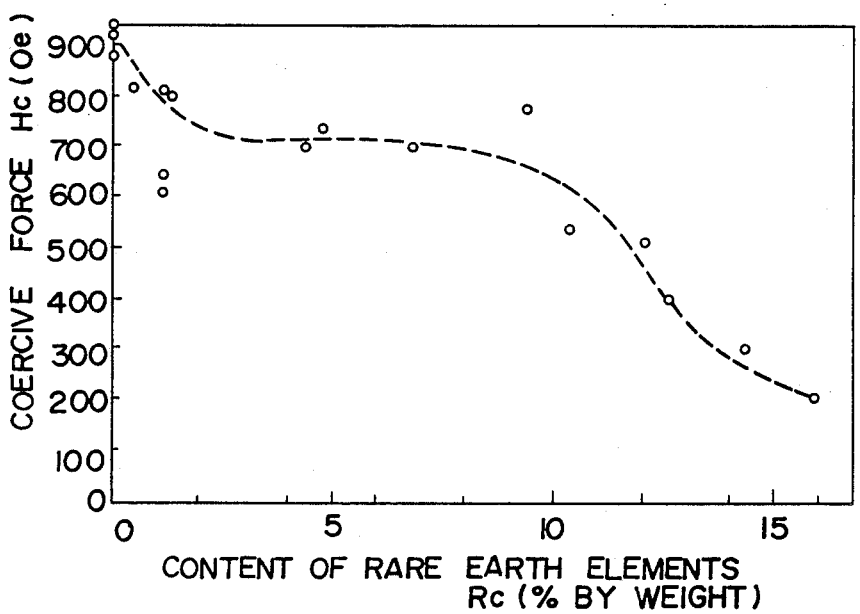
Figure 16:
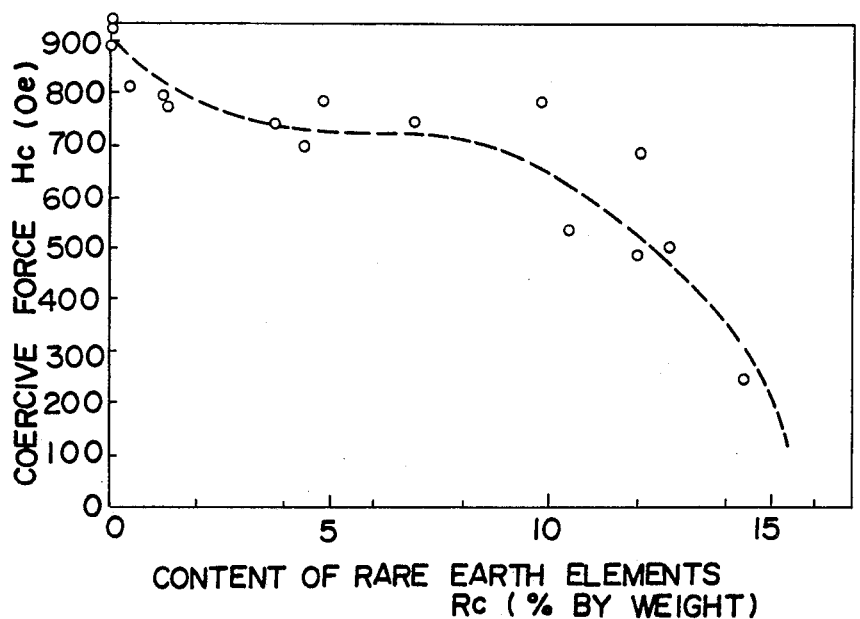
Figure 17:
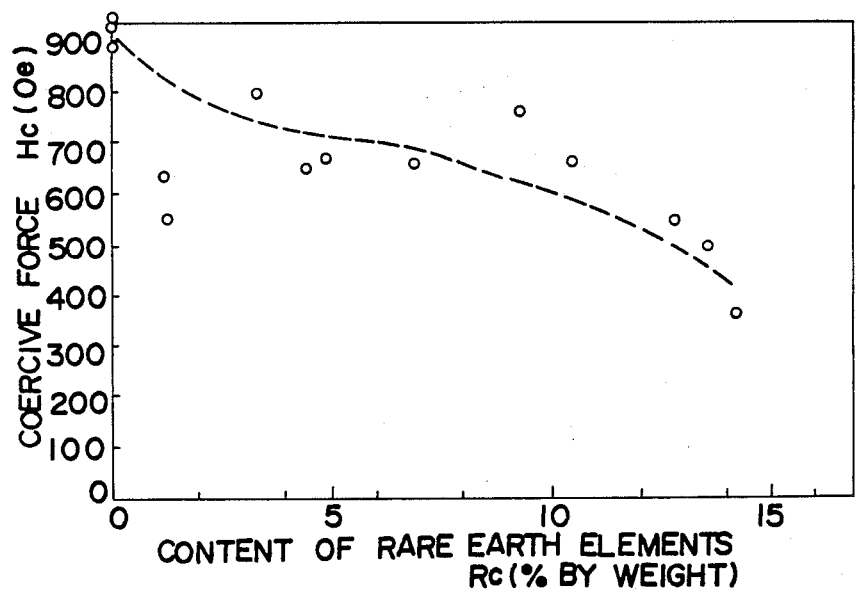
Figure 18:
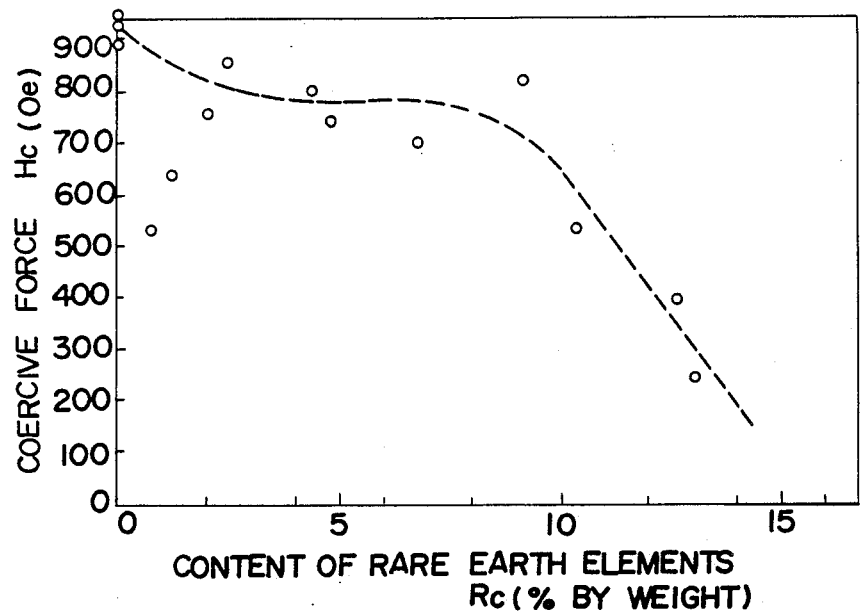
Figure 19:
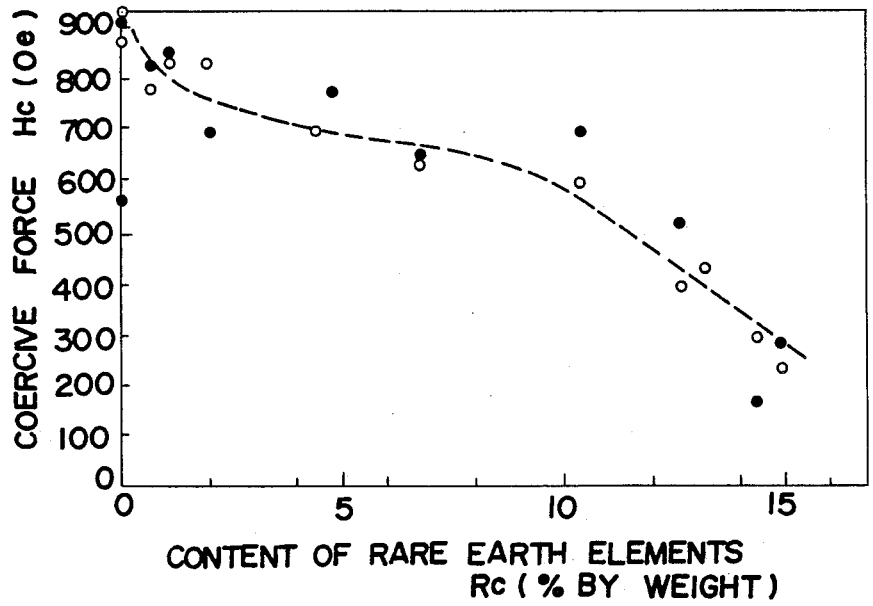

| | Symbol | Co (wt %) | Ni (wt %) | R (wt %) | O (wt %) |
|---|---|---|---|---|---|
| FIG. 12 | ○ | 79-Rc | 16 | Y = Rc | 5 |
| " | ● | 80-Rc | 15 | (La:Ce = 3:7) = Rc | 5 |
| FIG. 13 | ○ | 79-Rc | 16 | Pr = Rc | 5 |
| FIG. 14 | ○ | " | 16 | Nd = Rc | 5 |
| FIG. 15 | ○ | " | 16 | Sm = Rc | 5 |
| FIG. 16 | ○ | " | 16 | Gd = Rc | 5 |
| FIG. 17 | ○ | " | 16 | Tb = Rc | 5 |
| FIG. 18 | ○ | " | 16 | Dy = Rc | 5 |
| FIG. 19 | ○ | " | 16 | (Pr:Gd = 10:1) = Rc | 5 |
| " | ● | 80-Rc | 15 | (Gd:Dy = 2:1) = Rc | 5 |

From Table 1, the followings can be seen, that is conventional example Nos. 56 and 57 lack in the rare earth element R in the thin film composition, and go out of the composition range of this invention for oxygen in conventional Examples Nos. 58, 59, 60, 62, 63, 64, 65, 66, 68, 70, 72, 73, 75, 76, 78, 80, 81, 83 and 84, for Ni in No. 79 and for rare earth element in Nos. 61, 64, 67, 69, 71, 74, 77, 82 and 85 and they are poor in either or both of the magnetic properties and the corrosion resistance, whereas it is shown that examples Nos. 1-31 are excellent in the magnetic properties and the corrosion resistance.

As apparent from the foregoing, this invention provides Co-Ni series magnetic recording media which are excellent in magnetic properties and the corrosion resistance.

We claim:

1. A magnetic recording medium comprising a non-magnetic substrate and a magnetic layer formed on said substrate, said magnetic layer consisting essentially of, on a weight basis, 0.3-13% of at least one rare earth element selected from the group consisting of La, Ce, Pr, Nd, Sm, Gd and Dy, 3-13% of oxygen, and a balance of Co and inevitable impurities.

2. A magnetic recording medium as defined in claim 1, wherein the magnetic layer further contains between 2.4 and 22% by weight Ni.

3. A magnetic recording medium as defined in claim 1, wherein the inevitable impurities are less than 1% by weight of one or more element selected from the group consisting of B, C, Al, Si, Sn, S, Cu, Zn, Fe, Ti, Cr and Zr.

4. A magnetic recording medium as defined in claim 1, wherein the magnetic layer has a thickness of 0.1 $\mu$m-1.0 $\mu$m.

5. A magnetic recording medium as defined in claim 1, wherein the non-magnetic substrate has a thickness of 5-25 $\mu$m.

6. A magnetic recording medium as defined in claim 5, wherein the non-magnetic substrate is composed of a polymer selected from the group consisting of polyester, acetate, polycarbonate and polyimide.

7. A magnetic recording medium as defined in claim 1, wherein the nonmagnetic substrate is glass.

8. A magnetic recording medium as defined in claim 1, wherein the non-magnetic substrate made of Al.

9. A magnetic recording medium as defined in claim 1, wherein the magnetic layer is formed by at least one of a sputtering method, an ion plating method and a vacuum deposition method.

10. A magnetic recording medium as defined in claim 1, wherein the non-magnetic substrate is subjected to a corona discharging treatment before the magnetic layer disposition thereon.

* * * * *